(12) United States Patent
Homan et al.

(10) Patent No.: US 7,825,664 B2
(45) Date of Patent: Nov. 2, 2010

(54) RESISTIVITY TOOL WITH SELECTABLE DEPTHS OF INVESTIGATION

(75) Inventors: Dean Homan, Sugar Land, TX (US); Edward Nichols, Berkeley, CA (US); Michael Wilt, Walnut Creek, CA (US); Jean Seydoux, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 567 days.

(21) Appl. No.: 11/612,881

(22) Filed: Dec. 19, 2006

(65) Prior Publication Data

US 2007/0137854 A1  Jun. 21, 2007

Related U.S. Application Data

(63) Continuation-in-part of application No. 11/160,533, filed on Jun. 28, 2005.

(60) Provisional application No. 60/587,689, filed on Jul. 14, 2004.

(51) Int. Cl.
*G01V 3/18* (2006.01)
*G01V 3/30* (2006.01)

(52) U.S. Cl. .................... 324/334; 324/339; 324/343

(58) Field of Classification Search .......... 324/334, 324/339, 343
See application file for complete search history.

(56) References Cited

U.S. PATENT DOCUMENTS

| | | | |
|---|---|---|---|
| 3,067,383 A | 12/1962 | Tanguy | |
| 3,329,889 A | 7/1967 | Tanguy | |
| 4,209,747 A * | 6/1980 | Huchital | ..................... 324/338 |
| 4,511,843 A | 4/1985 | Thoraval | |
| 4,739,325 A | 4/1988 | MacLeod | |
| 5,117,927 A | 6/1992 | Askew | |
| 5,157,605 A | 10/1992 | Chandler et al. | |
| 5,661,402 A | 8/1997 | Chesnutt et al. | |
| 5,955,884 A | 9/1999 | Payton et al. | |
| 6,047,240 A | 4/2000 | Barber et al. | |
| 6,057,784 A | 5/2000 | Schaaf et al. | |
| 6,188,222 B1 | 2/2001 | Seydoux et al. | |
| 6,294,917 B1 | 9/2001 | Nichols | |
| 6,480,000 B1 | 11/2002 | Kong et al. | |
| 6,525,540 B1 | 2/2003 | Kong et al. | |
| 6,538,447 B2 * | 3/2003 | Bittar | ..................... 324/338 |
| 6,591,673 B1 | 7/2003 | Liu | |
| 6,594,584 B1 | 7/2003 | Omeragic et al. | |
| 6,690,170 B2 | 2/2004 | Homan et al. | |
| 6,969,994 B2 | 11/2005 | Minerbo et al. | |
| 7,023,213 B2 | 4/2006 | Nichols | |
| 7,091,722 B2 | 8/2006 | Homan et al. | |

(Continued)

*Primary Examiner*—Reena Aurora
(74) *Attorney, Agent, or Firm*—Jonna Flores; Darla Fonseca; Charlotte Rutherford (57) ABSTRACT

A wireline tool string used in a wellbore to determine formation properties is disclosed which comprises one or more transmitter tools disposed within the tool string, each transmitter tool having three linearly independent coils; a receiver tool disposed within the tool string, wherein the receiver tool has three linearly independent coils; and a tool string component disposed between the one or mole transmitter tools and the receiver tool; wherein the one or more transmitter tools are selectably spatially separated from the receiver tool along the tool string to provide a desired depth of investigation and measurements made using the one or more transmitter tools and receiver tool are used to determine formation properties.

21 Claims, 7 Drawing Sheets

U.S. PATENT DOCUMENTS 7,091,877 B2  8/2006  Barber et al.
7,093,672 B2  8/2006  Seydoux et al.
2006/0011385 A1  1/2006  Seydoux et al.

* cited by examiner

RESISTIVITY TOOL WITH SELECTABLE DEPTHS OF INVESTIGATION

CROSS REFERENCE TO RELATED APPLICATIONS

This is a continuation-in-part of application Ser. No. 11/160,533 filed on Jun. 28, 2005, which claims priority under 35 U.S.C. §119(e) to Provisional Application Ser. No. 60/587,689 filed on Jul. 14, 2004

BACKGROUND

1. Technical Field

United States of America generally to the field of well logging. More particularly, this disclosure relates to tools and methods for measuring electrical properties of geological formations. Still more specifically, this disclosure relates to tools and methods for measuring the resistivity of a formation at relatively large radial distances from the borehole.

2. Description of the Related Art

Induction and propagation resistivity tools have been used for many years to measure the resistivity of geological formations surrounding a borehole in the presence of borehole fluids that may have invaded the formations Induction logging tools measure the resistivity (or, more accurately, its inverse, conductivity) of the formation by inducing eddy currents in the formations in response to an AC transmitter signal. The eddy currents induce secondary magnetic fields that in turn induce voltages in receiver antennas. Because the magnitudes of the eddy currents depend on formation conductivities, the magnitudes of the received signals thus reflect the formation conductivities A typical induction tool includes at least two, and preferably three, induction arrays having different spacings between the transmitters and the receivers to provide different depths of investigation. An early example of a dual array tool is disclosed in U.S. Pat. No. 3,067,383. A minimal configuration of such a tool includes two arrays having different transmitter-receiver spacings to measure two different depth of investigation: a deep array (ILD) and a medium array (ILM). The deep array is designed to "see" beyond the zone invaded by mud filtrate in order to provide true formation resistivity ($R_t$) In the prior art, the transmitters and receivers are common to one tool.

To determine the minimum parameters (the invaded zone resistivity, $R_{xo}$, the resistivity of the uninvaded zone, $R_t$, and the radius of invasion, $r_1$) of a formation invaded by drilling fluids, at least three measurements at different depths of investigation are required. Therefore, a third shallow measurement (a shallow measurement) has been provided by a focused electrode array placed on the tool. One such tool is disclosed in U.S. Pat. No. 3,329,889. The shallow measurement, together with the medium (ILM) and deep (ILD) measurements provided by the induction arrays, provide sufficient data to solve for formation resistivities in a formation having a simple invasion profile.

However, such a tool may not provide sufficient data for the determination of formation properties such as anisotropy or when the invasion profile is complex. Therefore, multi-array tools having non-axially aligned antennas have been introduced for the determination of formation resistivity in formations with mote complex invasion profiles Examples of multi-array tools include those disclosed in U.S. Pat. No. 5,157,605. The multiple arrays, having fixed spacings between the transmitter and the receiver, can provide measurements at fixed depths of investigation. Therefore, when mud invasion occurs to different extents (radii) in different formation layers, sufficient data may still be provided to solve for the true formation resistivity A significant drawback to prior art tools is the fixed spacing between transmitters and receivers within a single tool, limiting the measurements to fixed depths of investigation.

SUMMARY

A wireline tool string used in a wellbore to determine formation properties is disclosed which comprises one or mote transmitter tools disposed within the tool string, each transmitter tool having three linearly independent coils; a receiver tool disposed within the tool string, wherein the receiver tool has three linearly independent coils; and a tool string component disposed between the one or more transmitter tools and the receiver tool; wherein the one or more transmitter tools are selectably spatially separated from the receiver tool along the tool string to provide a desired depth of investigation and measurements made using the one or more transmitter tools and receiver tool are used to determine formation properties Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

DETAILED DESCRIPTION

Figure 1:
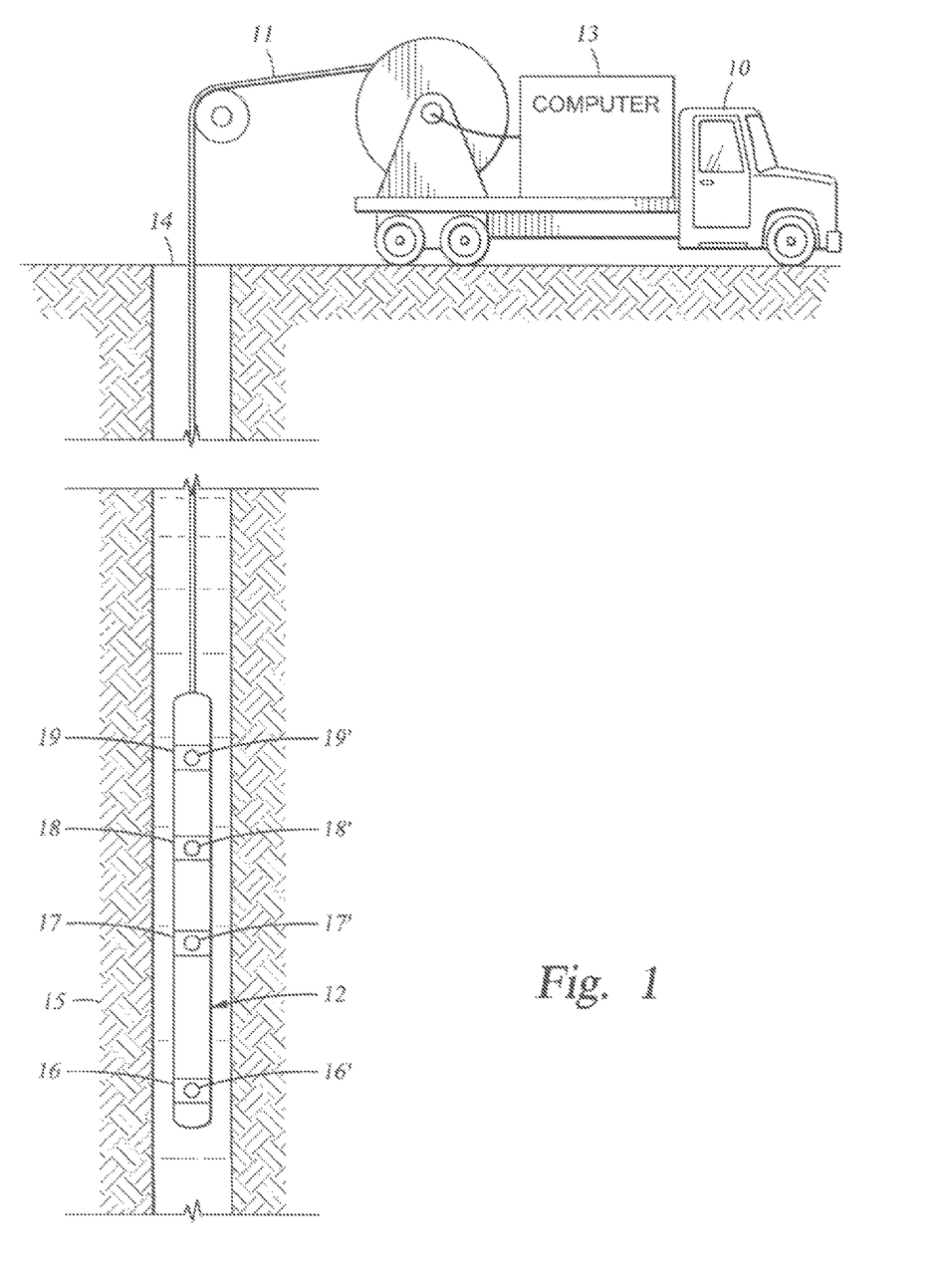
FIG. 1 schematically illustrates a resistivity tool disposed in a wellbore in accordance with one embodiment of the present invention FIG. 2 schematically illustrates the resistivity tool of FIG. 1 having three spaced transmitter tools equipped with variable-moment and multi-frequency triaxial antennas and a triaxial receiver tool disposed in a tool string

FIG. 1 illustrates a logging truck or mobile logging apparatus 10 equipped with a wireline 11 connected to a downhole tool string 12. The truck 10 is equipped with a processing station 13. For purposes of this disclosure, the tool string 12 may include a complete suite of logging services or tools For example, porosity, permeability, formation testing, and other types of known logging tools may comprise part of tool string 12. Tool string 12 is lowered into borehole 14 to make measurements on formation 15

The present invention preferably uses relatively long spacing(s) between a receiver tool 16 and one or more transmitter tools. Three exemplary transmitter tools 17, 18, and 19 are shown in FIG. 1. While three transmitter tools 17, 18, 19 ate shown in the embodiment of FIG. 1, any number of transmitter tools can be placed at any distance from receiver tool 16 in tool string 12 so long as each transmitter-receiver combination is within an operable range (meaning the signal-to-noise ratio is of acceptable magnitude).

Figure 4:
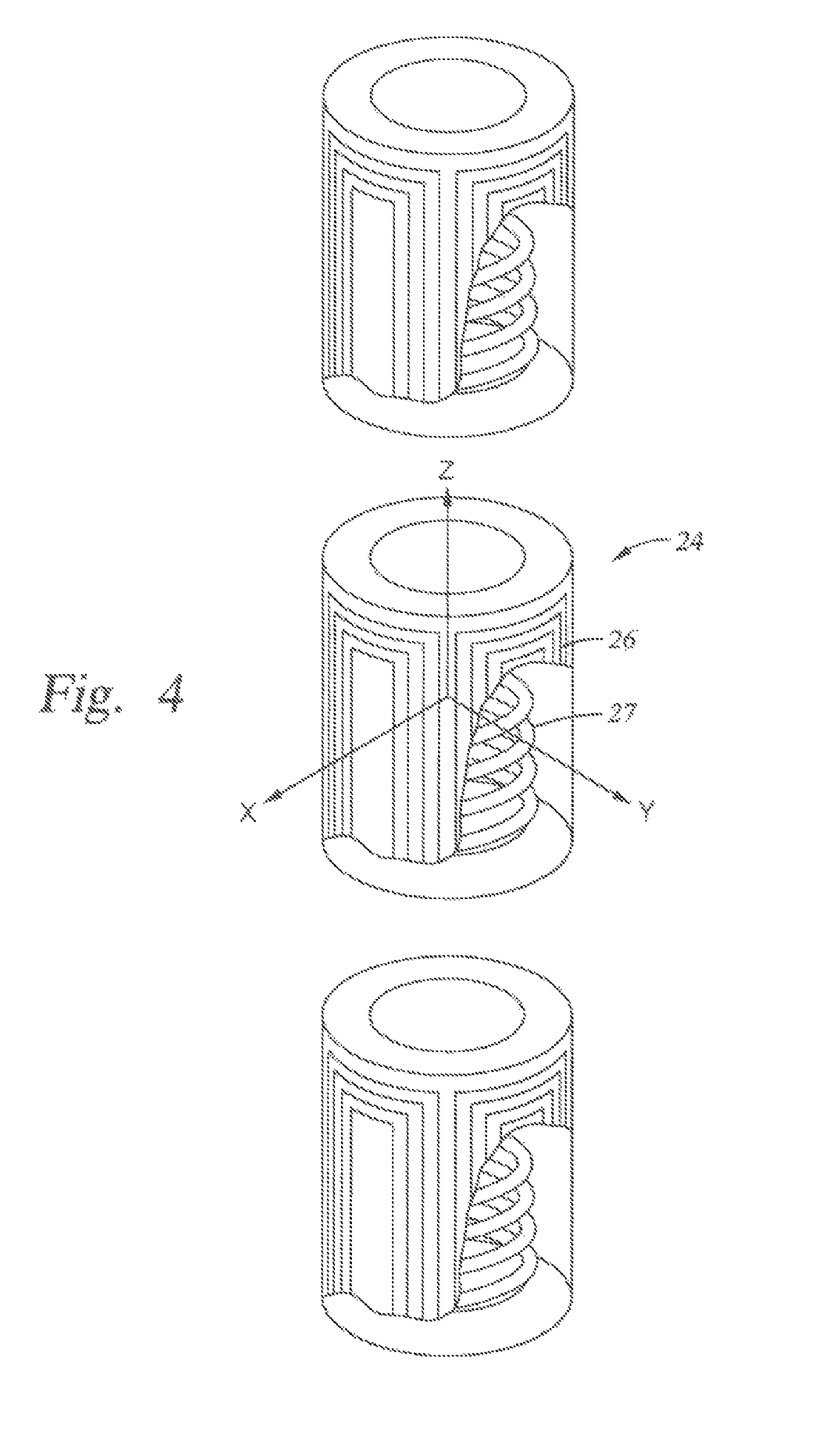
FIG. 4 is a schematic diagram of three triaxial antennas, any one or more of which can be used in the transmitter tools or receiver tool of FIG. 2.

The spacing between transmitter tool 17 and receiver tool 16, for example, can be of any desired length since transmitter tool 17 and receiver tool 16 are separate tools. Because the depth of investigation of the measurement is proportional to the spacing, longer spacings allow for deeper depths of investigation. An operator may decide a priori what depth of investigation is desired, and the transmitter-receiver spacing can be set accordingly. The spacing may be roughly equal to the depth of investigation, or may be derived from a mote detailed calculation. Thus, other tools may be placed in tool string 12 between transmitter tool 17 and receiver tool 16, or alternatively, blank pipe can be used to provide the desired spacing To obtain sufficient information to characterize the formation properties, the antennas in transmitter tool 17 and receiver tool 16 are preferably triaxial coils A triaxial coil 24 (FIG. 4) generally includes three orthogonal coils, one of which is axially aligned (meaning its magnetic moment is parallel to the tool axis) and two coils whose magnetic moments are perpendicular to the tool axis The three coils may or may not be co-located FIG. 4 shows an embodiment in which a solenoid-type coil 27 is used for the axially aligned coil and two saddle coils 26 are used for the "perpendicular" coils, but the invention is not limited to those coil types or configurations. For example, tilted coils (meaning a coil whose magnetic moment has both axial and perpendicular components) may also be used For a given tool, any configuration in which the coils are linearly independent may be used. While individual transmitter or receiver tools use either triaxial or tilted coils, the tool string may comprise transmitter and receiver tools that use a triaxial antenna, tilted coils, or both.

As the depth of investigation is increased, the signal intensity is attenuated, resulting in a poorer signal-to-noise ratio. This can be compensated for, to some extent, by using a lower frequency. The lower frequency also helps to provide a deeper depth of investigation, for reasons discussed below Thus, multi-frequency antennas may be used to allow flexibility in choosing the depth of investigation. In addition, the signal-to-noise ratio can be improved by increasing the magnetic moment of the antenna. This can be done, for example, by placing multiple triaxial coils 24 in close proximity to each other within each transmitter tool 17 or receiver tool 16. Different coils of say, transmitter tool 17, can be selectively energized to multiply the magnetic moment. At large depths of investigation, the multiple coils will "appear" to be a single coil with enhanced moment.

Figure 2:
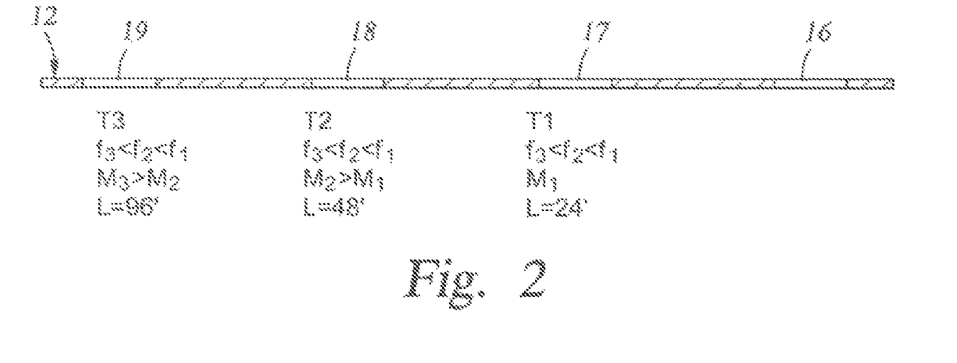

With respect to FIG. 2, one configuration of tool string 12 is shown without describing additional tools that may be disposed in tool string 12 between the transmitter and receiver tools. By way of example only, three triaxial magnetic dipole transmitter tools 17, 18, and 19 are deployed in tool string 12 above receiver tool 16 at distances of approximately 24-ft, 48-ft, and 96-ft. Those skilled in the art will realize that those dimensions are by way of example only and can vary significantly and still fall within the scope of the present invention.

By the principle of reciprocity, receiver tools 17', 18', 19' (shown in phantom in FIG. 1) can be deployed in the tool string 12 with a transmitter tool 16' (also shown in phantom) to provide an alternate embodiment of the present invention. For ease of discussion, only the embodiment of transmitter tools 17, 18, and 19 used in combination with receiver tool 16 will be discussed herein, although the converse can be employed. While separate transmitter and receiver tools are discussed herein, each transmitter tool and each receiver tool can be an entire induction or propagation tool comprising transmitters and receivers, wherein the transmitter of one tool operates in conjunction with the receiver of another tool. In addition, the measurements from a single entire tool may be used in conjunction with the measurements from the separate tools to more fully characterize the formation at various depths of investigation.

The transmitters tools 17, 18, 19 may be deployed to provide either a two-coil response or a propagation-type response. In the latter configuration, two transmitter tools (say, 17, 18 and 18, 19, for example) are used and their responses combined to yield attenuation and phase shift. Transmitter tools 17, 18, 19 can operate at multiple frequencies such as 0.5, 2, 5, 10, 20, and 50 kHz with corresponding magnetic moments near 3.3, 6.6, and 10 $Am^2$. In the case of a two-coil measurement, transmitter tools 17, 18 and 19 need to be synchronized with receiver tool 16 to measure a trans-impedance tensor. Transmitter tools 17, 18, 19 can be calibrated using a triaxial receiver coil mounted on each transmitter tool Receiver tool 16 can be calibrated using a tilted test loop to excite receiver tool 16 and then comparing the measured response to a modeled response.

Figure 3:
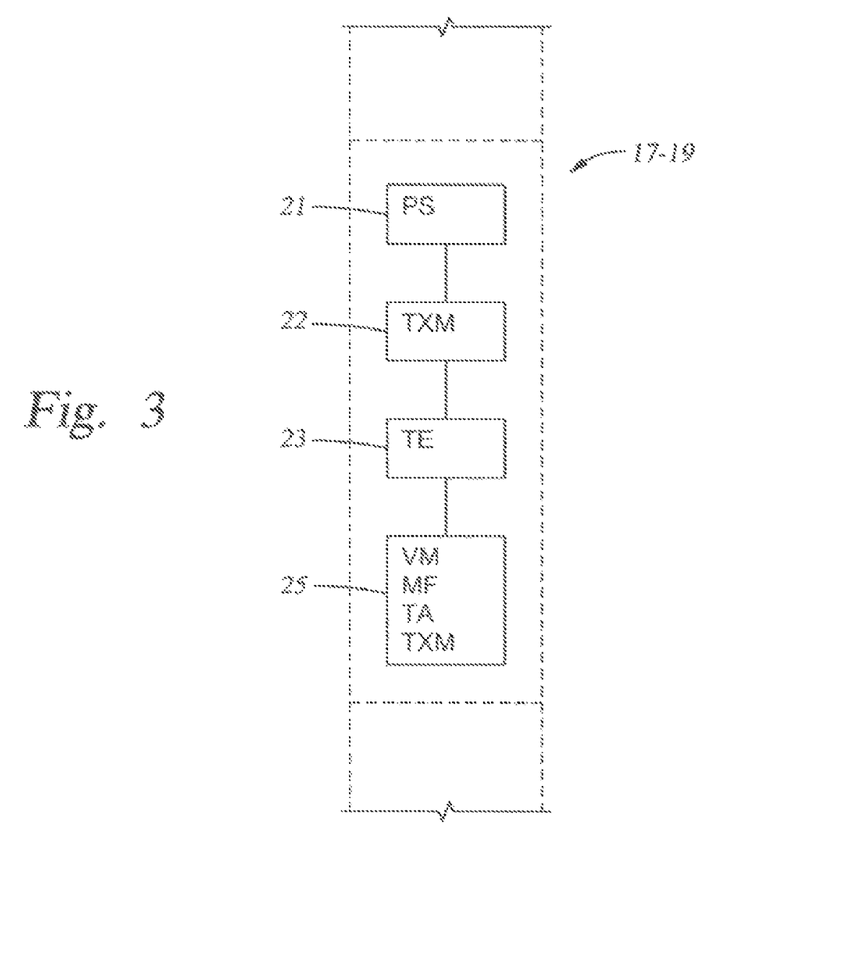
FIG. 3 is a schematic illustration of one embodiment of a transmitter tool as illustrated in FIG. 2

In the embodiment of FIGS. 3 and 4, each transmitter tool 17, 18, 19 comprises a power supply 21, a transmitter board 22, a telemetry board 23, and a variable moment and multi-frequency board 25. Triaxial coil 24 may be constructed about a mandrel as illustrated in FIG. 4. As described above, multiple triaxial coils 24 may be used to form a variable moment antenna for each tool. These multiple triaxial coils 24 can be switched in series to either decrease or increase the moment as desired, depending upon the spacing between transmitter tools 17, 18, 19 and receiver tool 16. Similarly, the frequency may vary with transmitter-receiver distance. Typically, low frequencies would be used for the longer spacing configurations. As noted above, transmitter tools 17, 18, 19 may also be used as receivers provided that a receiver board is added to tools 17, 18, 19. This construction would allow greater versatility or operational range. In such an embodiment, four tools could be employed with one tool acting as a transmitter and the others acting as receivers, or vice versa.

As stated above, receiver tool 16 and transmitter tools 17, 18, 19 must be synchronized such that the voltage sensed by receiver tool 16 is measured with respect to the drive current in transmitter tools 17, 18, 19. The phase angle between the transmitter drive current and the receiver voltage must be measured extremely accurately. This can be achieved, for example, by sending a timing signal through a wire from each transmitter tool 17, 18 and 19 to receiver tool 16.

As described above, transmitter tools 17, 18, 19 are placed in tool string 12 at selected distances from receiver tool 16. Those distances are input into processing software. The input and the measured data can be processed downhole, but are preferably delivered to processing station 13 via wireline 11 and processed at the surface Alternatively, the information may be recorded and sent to a computing center for processing. The processing produces three-dimensional resistivity images of the formation surrounding the borehole. The more transmitter-receiver spacings measured, the more detailed the 3-D image will be. Those images can be used for formation evaluation.

Figure 5:
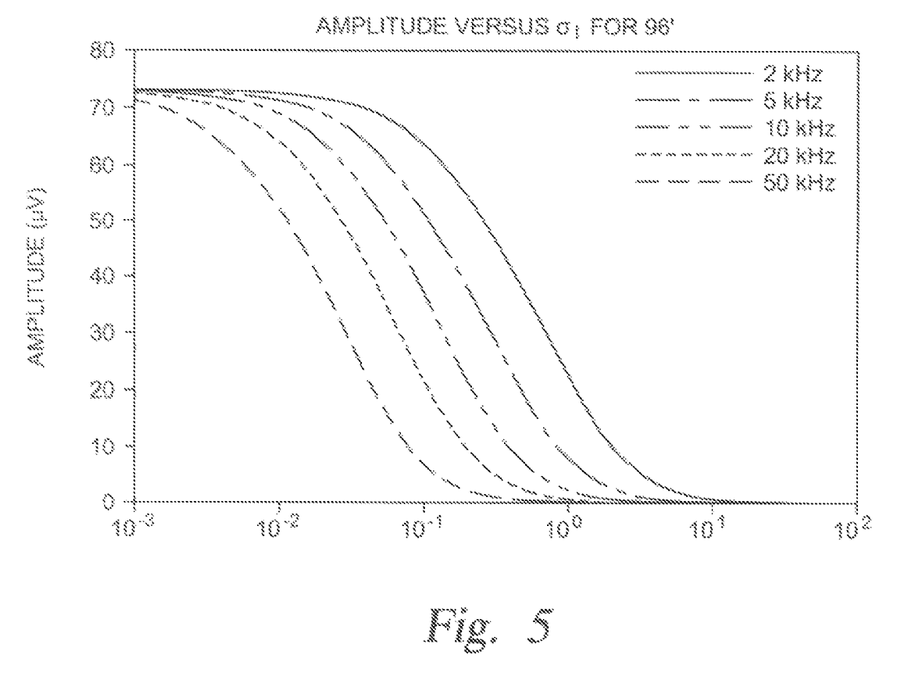
FIG. 5 graphically illustrates receiver amplitude versus formation conductivity for an infinite homogeneous medium using a disclosed axial 2-coil tool with a 96 foot spacing at multiple frequencies FIG. 6 schematically illustrates a model of a three-bed formation having a vertical borehole therein.

To confirm the present invention can be used at the larger spacings, the signal that would be received when the invention is operated in a homogeneous formation was modeled. Typical voltage response curves for an axial 2-coil tool versus formation conductivity at drive frequencies of 2, 5, 10, 20 and 50 kHz are shown in FIG. 5. In this plot, the receiver voltage has been scaled in frequency and coil spacing so all the curves are normalized. In FIG. 5, the receiver amplitude is plotted as a function of the formation conductivity for a 96-foot spacing between the transmitter and receiver. The plot shows ample signal level at this long spacing.

Figure 6:
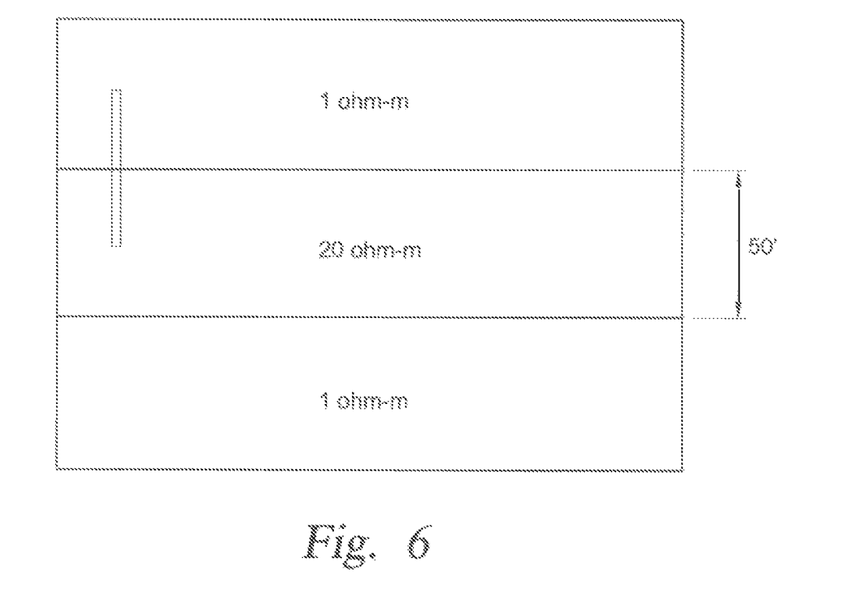
Figure 7:
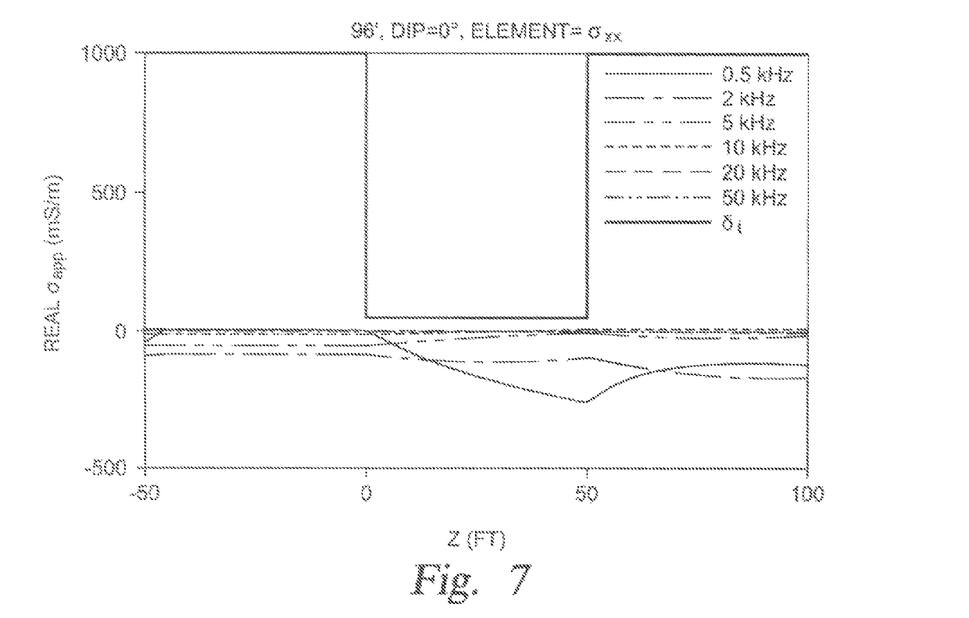
FIG. 7 is a plot of the real portion of the $\sigma_{xx}$ component of the apparent conductivity versus the distance from a first bed boundary to the transmitter using a 96-foot transmitter-receiver spacing in a vertical orientation.
Figure 8:
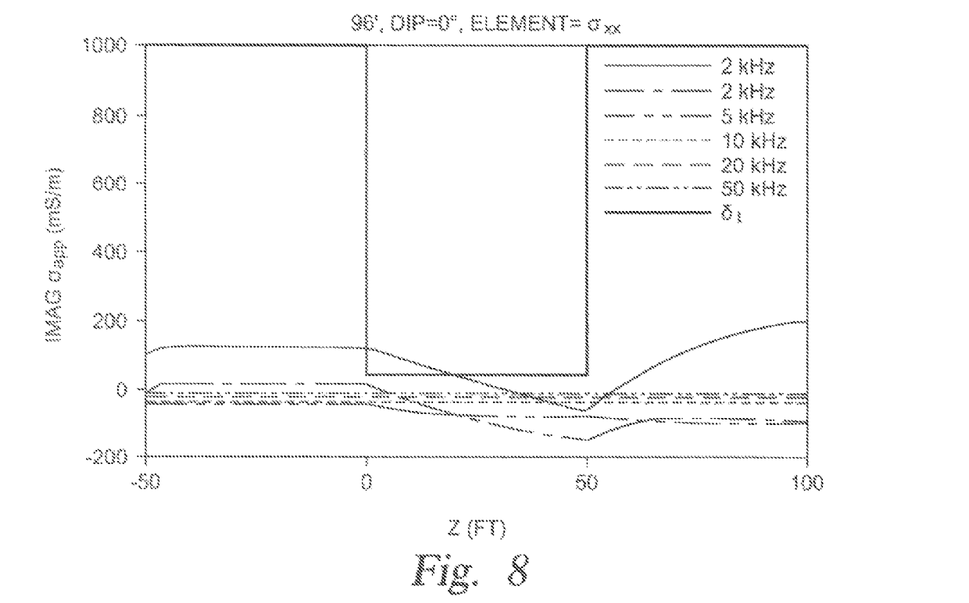
FIG. 8 is a plot of the imaginary portion of the $\sigma_{xx}$ component of the apparent conductivity versus the distance from a first bed boundary to the transmitter using a 96-foot transmitter-receiver spacing in a vertical orientation.

The invention's response was also modeled using a three-bed formation in which the invention is operating in a vertical borehole, as shown in FIG. 6. The model predicts the measured conductivity of the three bed formation. The transmitter tool depth is given relative to the first bed boundary. As a transverse dipole of either the transmitter or the receiver crosses a bed boundary, a local minimum or maximum value of the apparent conductivity will be observed, as shown in FIGS. 7 and 8. While several spacings were modeled to provide responses using a triaxial transmitter and triaxial receiver configuration, only the apparent conductivity for the xx measurement for the 96-foot spacing is shown in FIGS. 7 and 8. The results shown in FIGS. 7 and 8 can be more readily understood by noting that as the frequency and spacing increase, the apparent conductivity decreases due to the skin effect, $\delta=\sqrt{2/(\omega\mu\sigma)}$. By symmetry, the off-diagonal elements are zero, and $\sigma_{xx}$ and $\sigma_{yy}$ are equal for all spacings.

Figure 9:
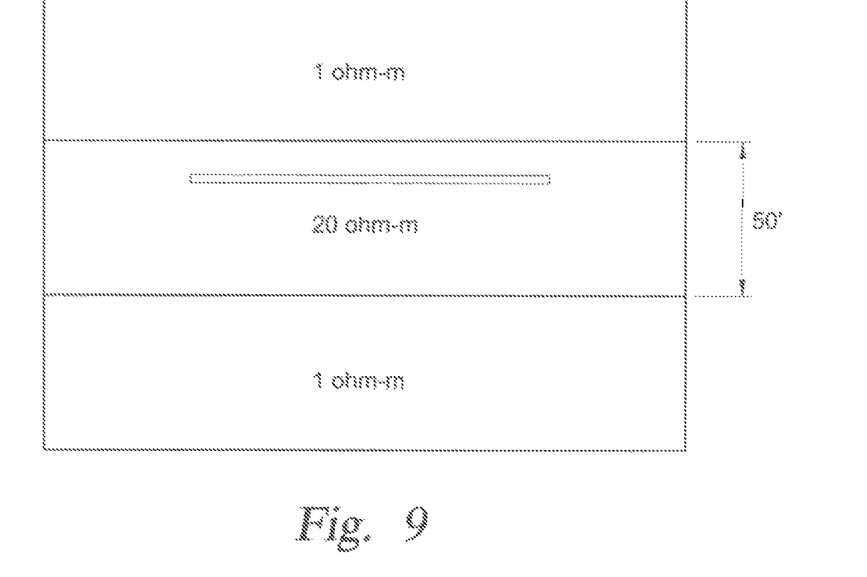
FIG. 9 schematically illustrates a model of a three-bed formation having a horizontal borehole therein.
Figure 10:
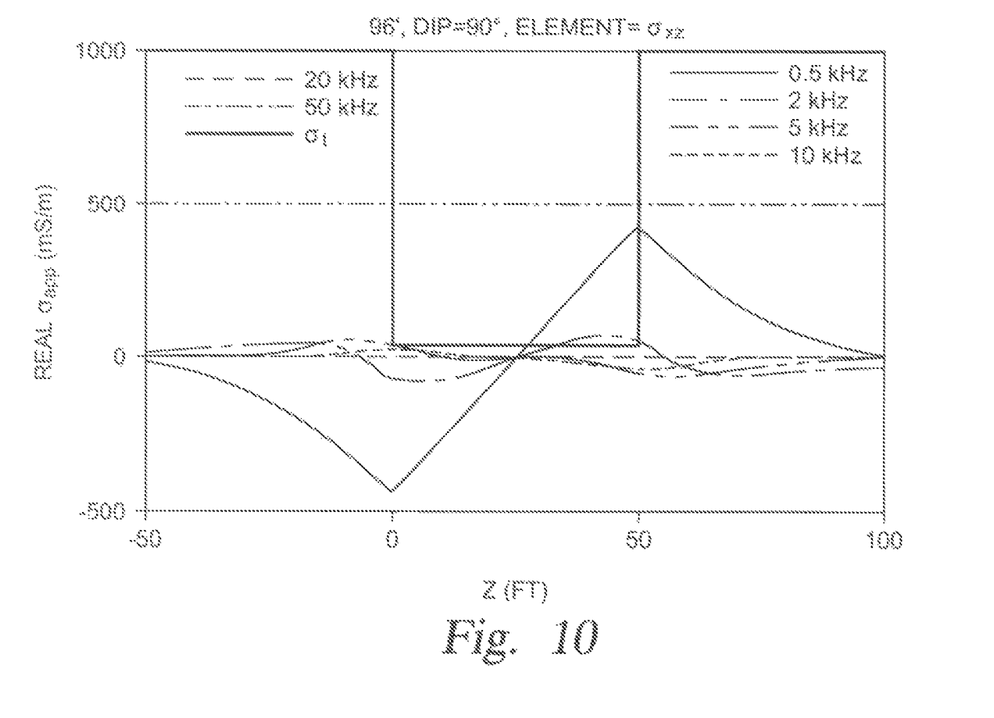
FIG. 10 is a plot of the real portion of the $\sigma_{xz}$ component of the apparent conductivity versus the distance from a first bed boundary to the transmitter using a 96-foot transmitter-receiver spacing in a horizontal orientation.
Figure 11:
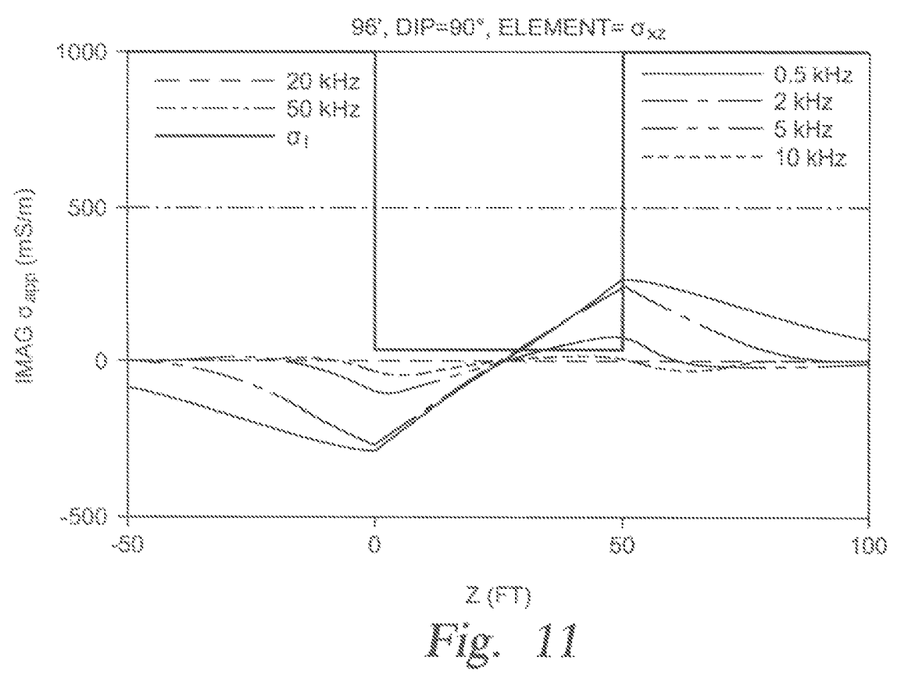
FIG. 11 is a plot of the imaginary portion of the $\sigma_{xz}$ component of the apparent conductivity versus the distance from a first bed boundary to the transmitter using a 96-foot transmitter-receiver spacing in a horizontal It should be understood that the drawings are not necessarily to scale and that the disclosed embodiments are sometimes illustrated diagrammatically and in partial views In certain instances, details which are not necessary for an understanding of the disclosed method and apparatus or which render other details difficult to perceive may have been omitted It should be understood that this disclosure is not limited to the particular embodiments illustrated herein.

The invention's response was further modeled using a three-bed formation in which the invention is operating in a horizontal borehole, as shown in FIG. 9. By symmetry, the $\sigma_{xy}$, $\sigma_{yx}$, $\sigma_{zy}$ and $\sigma_{zy}$ components of the apparent conductivity are zero. As the frequency and spacing increase, the apparent conductivity decreases due to the skin effect, $\delta=\sqrt{2/(\omega\mu\sigma)}$ The $\sigma_{xx}$ has a lazy response and makes a smooth transition between the bed boundaries, while the $\sigma_{zx}$, $\sigma_{xz}$, $\sigma_{yy}$, and $\sigma_{zz}$ responses have discontinuities at the bed boundaries A sample result is shown for the $\sigma_{xz}$ component in FIGS. 10 and 11. The response to the bed boundaries is due to the transmitter current densities crossing the boundaries with some normal components. The $\sigma_{xx}$ response has a current density that is parallel to the plane of the bed boundaries and therefore continuous through the bed boundary. The local discontinuities at the bed boundaries for the other components make the triaxial measurement appropriate to define the formation geometry or lithology. In practice these measurements must be inverted to obtain the formation geometry and formation conductivity.

A tool string 12 can be placed in one wellbore while one or more transmitter tools are placed in a nearby wellbore such that the receiver tool 16 of tool string 12 interacts with the transmitter tools in the other wellbore. As another alternative, surface to borehole measurements may be made by employing a transmitter on the surface and one or more receiver tools in the wellbore.

While only certain embodiments have been set forth, alternatives and modifications will be apparent from the above description to those skilled in the art. These and other alternatives ate considered equivalents and within the scope of this disclosure and the appended claims.

What is claimed is:

1. A wireline tool string used in a wellbore to determine formation properties, comprising:
   one or more transmitter tools disposed within the tool string, each transmitter tool having three linearly independent coils;
   a receiver tool disposed within the tool string, wherein the receiver tool has three linearly independent coils; and
   a tool string component disposed between the one or more transmitter tools and the receiver tool;
   wherein the one or more transmitter tools are spatially separated from the receiver tool by a separation spacing that is adjustable based on a given depth of investigation and operational frequency; and
   wherein measurements made using the one or more transmitter tools and receiver tool are used to determine formation properties of a diameter about the wellbore approximately equal to the separation spacing.

2. The tool string of claim 1, wherein at least one of the transmitter tools and receiver tool has a variable magnetic moment antenna.

3. The tool string of claim 1, wherein at least one of the transmitter tools and receiver tool has a multi-frequency antenna.

4. The tool string of claim 1 wherein at least one set of three linearly independent coils comprises a triaxial coil.

5. The tool string of claim 1, wherein at least one set of three linearly independent coils comprises tilted coils.

6. The tool string of claim 1, wherein the measurements are induction or propagation resistivity measurements.

7. The tool string of claim 1, wherein at least one of the transmitter tools and receiver tool comprises an entire induction or propagation resistivity tool.

8. The tool string of claim 1, wherein the tool string component comprises a porosity-type tool, a formation evaluation tool, a formation testing tool, a blank pipe, or any combination thereof.

9. The tool string of claim 1, wherein the selectable spatial separation is between about 20-feet and about 100-feet.

10. The tool string of claim 1, wherein the transmitter tools act as receivers and the receiver tool acts as a transmitter.

11. The tool string of claim 1, further comprising a synchronization wire electrically connecting the one or more transmitter tools and the receiver tool.

12. A method to make resistivity measurements in an earth formation, comprising:
   selecting a depth of investigation;
   providing one or more transmitter tools disposed within a tool string in a wellbore, each transmitter tool having three linearly independent coils;

providing a receiver tool disposed within the tool string, wherein the receiver tool has three linearly independent coils;

selecting a separation spacing between the one or more transmitter tools and the receiver tool based on the depth of investigation and operational frequency; and making resistivity measurements using the one or more transmitter tools and the receiver tool to determine a formation property of a diameter about the wellbore approximately equal to the separation spacing.

13. The method of claim 12, further comprising adjusting the magnetic moments of one or more sets of three linearly independent coils to obtain a given signal level.

14. The method of claim 12, further comprising selecting the frequency of one or more sets of three linearly independent coils to obtain a given signal level.

15. The method of claim 12, further comprising using a triaxial coil, tilted coils, or a combination of triaxial and tilted coils.

16. The method of claim 12, further comprising synchronizing the voltage sensed by the receiver tool with the drive current in the one or more transmitter tools.

17. The method of claim 12, further comprising:

adjusting the spacing between the one or more transmitter tools and the receiver tool for a second depth of investigation and a second operational frequency; and repeating the resistivity measurements using the one or more transmitter tools and the receiver tool.

18. A wireline tool string used in a wellbore to determine formation properties, comprising:

one or more transmitter tools disposed outside the wellbore, each transmitter tool having three linearly independent coils;

a receiver tool disposed within the tool string, wherein the receiver tool has three linearly independent coils; and wherein the one or more transmitter tools are spatially separated from the receiver tool by a separation spacing that is adjustable based on a given depth of investigation and operational frequency; and wherein measurements made using the one or more transmitter tools and receiver tool are used to determine formation properties of a diameter about the wellbore approximately equal to the separation spacing.

19. The tool string of claim 18, wherein the one or more transmitter tools are disposed either on the surface or within a second wellbore.

20. The tool string of claim 18, wherein at least one of the transmitter tools and receiver tool has a variable magnetic moment antenna.

21. The tool string of claim 18, wherein at least one of the transmitter tools and receiver tool has a multi-frequency antenna.

* * * * *